Dec. 26, 1961 H. G. THRASHER ETAL 3,014,767
BALL JOINT BEARING
Filed Nov. 24, 1958
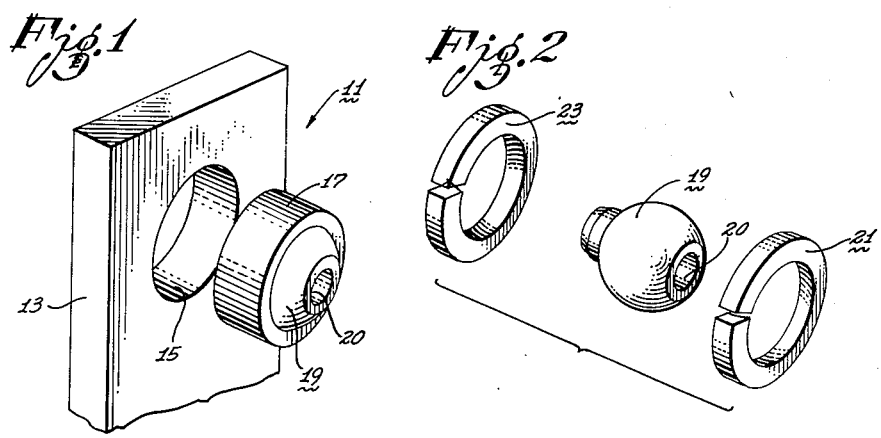
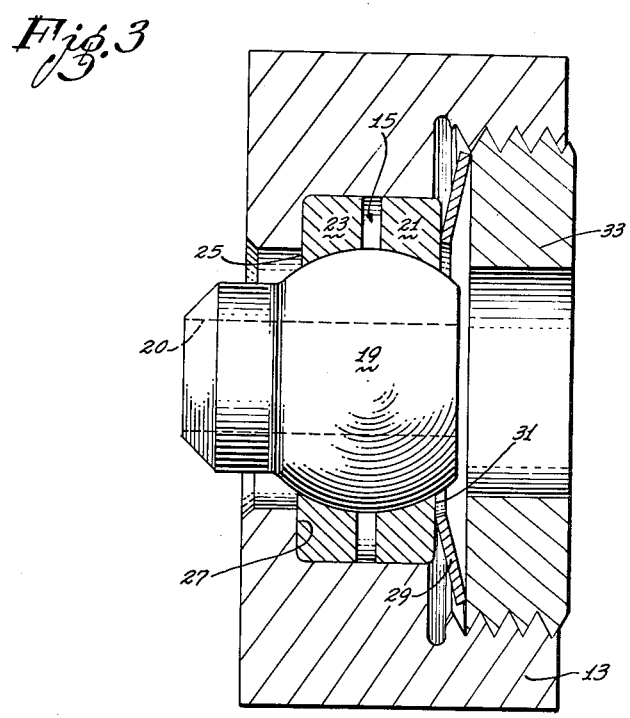
INVENTORS:
Howard G. Thrasher
Delmer L. Enge
By Richard K. Ehrlich
Attorneys

United States Patent Office 3,014,767
Patented Dec. 26, 1961

3,014,767
BALL JOINT BEARING
Howard G. Thrasher, Long Beach, and Delmer L. Enge, Los Angeles, Calif., assignors to Litton Industries of California, Beverly Hills, Calif.
Filed Nov. 24, 1958, Ser. No. 775,978
7 Claims. (Cl. 308—72)

The present invention relates to an improved ball joint bearing and more particularly to an improved ball joint bearing having a pair of split ring bushings, whereby the bearing can be easily inserted and removed from the bearing housing.

A ball joint bearing is a widely used bearing which allows an arm or rod to be rotatably coupled to a bearing housing or joint so that the arm is free to rotate within certain defined limits in every direction. As is apparent, a bearing of this type has wide application. For example, ball joint bearings are generally used to interconnect the connecting rods utilized in hydraulic cylinders. In addition, ball joint bearings can be beneficially used for intercoupling the connecting arms of an irrotational mount to a frame or other platform upon which the rotational mount is affixed. Briefly, an irrotational mount has utility in all navigational systems and is capable of undertaking translational movements with respect to the frame upon which it is mounted but which is highly resistant to rotational movement with respect to the mounting frame.

While ball and joint bearings of the prior art have numerous uses they have certain deficiencies which seriously affect their operation in some applications. In order to better understand the nature of these limitations of prior art ball joint bearings, it is necessary to understand the general structure of prior art ball joint bearings.

In a typical prior art ball joint bearing, a spherical ball joint is supported in a housing by a ring bushing which circumscribes the ball and which supports the ball in a bearing housing, the bushing generally being pressed against the ball joint for preloading the ball joint. One of the most serious difficulties encountered in this prior art type of ball joint bearing is that the bushing must be fitted into a circular aperture in the bearing housing so that a non slide fit will be obtained between the bushing and the housing. In order to obtain this no slide fit, the bushing must have a radius such that the bushing must be compressed in order to be inserted into the aperture. However, in order to compress the bushing, special tools are necessary, such as a hydraulic press. Furthermore, once the ball joint bearing is inserted in the housing, it is extremely difficult, if not impossible, to remove the ball joint bearing from the housing without damaging the ball joint bearing. Hence, it is impossible to disassemble the bearing for wear inspection without destroying the bearing.

Another disadvantage is that in removing the bearing, it is not only probable that the bearing will be damaged but it is very probable that the housing will be damaged thereby necessitating the removal of the bearing housing and the replacement thereof. It has been found, as heretofore mentioned, that the outer radius of the bushing must be larger than the radius of the aperture in order to insure a no slide fit and yet the radius must not be much larger or it will be impossible to compress the bearing sufficiently to insert it in the housing aperture. Hence, the bushing and aperture radii must be maintained within precise tolerances. For example, it has been found necessary in many applications to maintain the bushing and aperture tolerances within +.0000 and —.0005 inch.

Another limitation encountered with prior art ball joint bearings is that there is no way in which the preload set into the ball joint bearing at manufacture can be adjusted or maintained. This has been found to be a serious limitation in that after a relatively short period of use wear experienced by the surfaces of the ball joint and the bushing supporting it is sufficient to substantially eliminate the preload set into the bearing at manufacture. With the loss of preload, there is no longer any permanence of shaft position in the absence of a torquing force nor is there any insurance of precision of operation. This is particularly true in applications where the ball joint is to be used in apparatus which is subjected to relatively high frequency vibrations without any substantial preload in the ball joint bearing since the vibrations will cause translational movement of the ball joint with respect to the bushing and the housing, whereby the ball joint will literally smash itself to pieces as well as destroying whatever apparatus is coupled thereto.

It is apparent from the foregoing comments that prior art ball joint bearings suffer from limitations which seriously limit their use in some applications. For example, prior art ball joint bearings are difficult to insert and remove from bearing housings wtihout damaging the housing as well as the bearing and they are unable to maintain any fixed or predetermined preload on the spherical ball joint. Further, prior art ball joint bearings require special tools in order to be inserted into the bearing housings, and they cannot be readily disassembled for wear inspection.

The present invention overcomes the foregoing enumerated and other limitations of prior art ball and joint bearings, in accordance with the basic concepts of the invention, by providing a pair of bushing rings which are split open so that they are easily compressible and expandable whereby a ball joint bearing of the invention can be easily inserted and removed from the bearing housing.

In accordance with another of the basic concepts of the invention, the ball joint is supported in the bearing housing between the pair of split ring bushings and the bushings are adjustably compressed toward each other whereby any predetermined preload can be applied to the ball joint socket by selectively adjusting the degree of compression between the split ring bushings. In accordance with these and other concepts of the invention, the ball joint bearing can be easily inserted or removed from the bearing housing without any special tools and without fear of damaging the housing aperture. In addition, since the bushing rings are split and therefore compressible and expandable, the aperture and bushing tolerances can vary within relatively wide limits. Furthermore, the preload of the ball joint bearing can be adjusted from time to time as circumstances demand and, in addition, a fixed and unvarying preload can be maintained by the ball joint bearing despite wear thereon.

In accordance with one embodiment of the invention, a spherical joint is supported in a bearing housing between a pair of spilt ring bushings, the pair of bushings being held in the housing by a retaining nut which contacts the side of one of the pair of bushings and exerts a compressive force on the bushings, the degree of the force being dependent upon the force with which the retaining nut is applied against the side of the bushing. Hence, by varying the position of the retaining nut any predetermined preload can be applied to the spherical joint.

It is therefore, an object of the present invention to provide a ball joint bearing which is adjustable to provide a fixed and unvarying preload.

It is another object of the present invention to provide a ball joint bearing which is easily inserted and removed from a bearing housing.

It is a further object of the present invention to provide a ball joint bearing having a pair of split ring bushings.

It is still another object of the present invention to provide a ball joint bearing having a pair of bushings for supporting a spherical joint.

The novel features which are believed to be characteristic of the invention, both as to its organization and method of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

FIGURE 1 is an isometric view of a conventional prior art ball joint bearing positioned adjacent an aperture in a bearing housing into which the bearing must be fitted in assembly.

FIGURE 2 is an isometric view of a disassembled ball joint bearing mechanized in accordance with the invention.

FIGURE 3 is an assembled view of a ball joint bearing mechanized in accordance with the concepts of the invention.

Referring now to the drawing wherein like or corresponding parts are designated by the same reference characters throughout several views, there is shown in FIGURE 1 an isometric view of a conventional prior art ball joint bearing 11 and a housing 13 having an aperture 15 therein, bearing 11 being fitted into aperture 15 during assembly of the bearing. In assembly, bearing 11 must be compressed in order to be inserted into aperture 15 since the outer radius of bearing 11 should be equal to or slightly larger than the aperture radius so that upon removal of the compressing forces the bearing will fit against the walls of aperture 15 tightly so that bearing 11 will not slip in relation thereto. As shown in FIGURE 1, bearing 11 includes a supporting bushing 17 and a ball joint 19 rotatable within bushing 17 so that a rod connected to ball joint 19 is free to rotate within certain defined limits.

Continuing with the description of the prior art ball joint bearing, it is apparent that there is no way in which the preload of the prior art ball joint bearing can be adjusted to compensate for the variations in preload due to wear on ball joint 19 and the inner wall of bushing 11, this wear leading to a loose fit between ball joint 19 and the inner walls of the bushings since the wear increases the inner radius of the bushings and decreases the radius of the ball joint. Hence, as a result of the wear on the ball joint and the bushing the preload of the ball joint bearing becomes less and less as the bearing undergoes more and more wear so that after a relatively short period of use there is substantially no preload at all on ball joint 19. The present invention overcomes these and other limitations of prior art ball and joint bearings in a manner which is hereinafter described in connection with FIGURE 2 wherein there is shown one embodiment of the present invention.

Referring now to FIGURE 2 there is shown an exploded isometric view of a ball joint bearing 19 and a pair of split ring bushings 21 and 23 which are in accordance with the basic concepts of the present invention. As shown in FIGURE 2, each of the pair of slip ring bushings 21 and 23 have their inner walls axially curved in such a manner that when the bushings are placed contiguous with ball joint 19 their inner walls will be in registry with a portion of the surface area of ball joint 19.

Continuing with the discussion of the invention, it is apparent from FIGURE 2, that each slip ring bushing is split so that the bushings can be easily compressed or expanded. As will be hereinafter noted, it is this feature of the slip ring bushings that allows a ball joint bearing of the present invention to be easily inserted and removed from a housing and which contributes to the adjustability of the preload of the ball and joint bearing. In order to more easily understand how these advantages are achieved with the slip ring bushings of the present invention, attention is directed to FIGURE 3, wherein there is shown a ball joint bearing positioned within a housing and mechanized in accordance with the present invention.

Referring now to FIGURE 3, bushings 21 and 23 are positioned within an aperture 15 whose radius is slightly less than the uncompressed or unexpanded radius of split ring bushings 21 and 23. Further, a side 25 of bushing 23 is positioned contiguous with a circular flange 27 formed on housing 13 at the end of aperture 15 and adjacent to and perpendicular with the circular walls of the aperture. As is further shown in FIGURE 3, ball joint 19 is supported between the pair of split ring bushings 21 and 23, the axially curved inner walls of the bushings being in registry with the spherical surface of ball joint 19 so that the ball joint is rotatably mounted.

Continuing with the description of the invention, a Belleville washer or spring 29 is held in contact with a side 31 of bushing 21 by a retaining nut 33. As shown in FIGURE 3, retaining nut 33 is coupled to bearing housing 13 by means of a male screw thread formed on the circular outer surface of the retaining nut and a corresponding internal female screw thread formed on the circular walls of an aperture 33 whose radius is substantially greater than the radius of aperture 15. In view of the foregoing description of the structure of the ball joint bearing of the invention shown in FIGURE 3, the manner of operation whereby the limitations of the prior art devices are overcome can be simply illustrated.

Referring now to the ease with which the ball joint bearing of the invention can be assembled, attention is again directed to the pair of split ring bushings 21 and 23. The bushings can be easily compressed and inserted into aperture 15 without any special instruments since the slit cut in the split ring bushings 21 and 23 has sufficient width so that the bushings can be compressed sufficiently to insert them within the aperture without the two ends of the bushings butting against each other. In a similar manner the split ring bushings can be removed from aperture 15 without any special tools and without fear of damaging the bushings or the aperture. Furthermore, it is clear that the tolerances of aperture 15 and of the outer radii of split ring bushings need not be held to anywhere near the accuracy required in a conventional ball joint bearing since, if aperture 15 is slightly larger or smaller than it should be with respect to the split rings, they can be compressed or will expand to take up the inaccuracy.

Continuing now with the discussion of the operation of the ball joint bearings of the invention, attention is directed to the adjustability of the preload in the ball joint bearings of the invention. As shown in FIGURE 3, the pair of split ring bushings 21 and 23 are compressed toward one another by Belleville washer 29 due to the pressure exerted thereon by retaining nut 33. As is apparent from FIGURE 3, the pressure exerted on Belleville washer 29 is adjustable by moving retaining nut 33 closer or further away from split ring bushing 21. It is equally clear from FIGURE 3 that retaining nut 33 can be moved closer or further away from split ring bushing 21 by rotating retaining nut 33 so that it moves forward or backwards along the threads provided on bearing housing 13. In addition, it is apparent that the magnitude of the preload is dependent upon the force compressing the pair of split ring bushings so that the preload is easily adjustable by simply rotating retaining nut 33. Hence, a given preload can be exerted upon ball 19 of the ball joint bearing of the invention and furthermore variations in the preload due to the wear of ball 19 and bushings 21 and 23 can be compensated for by moving retaining nut 33 closer to the Belleville washer thereby forcing the bushings closer together to make up for bushing and ball joint wear.

It is to be expressly understood, of course, that numerous modifications and alterations may be made in the ball joint bearing herein disclosed without departing from the basic concept of the invention. For example, it will be recognized that the force exerted on Belleville washer 29 can be accomplished by other means then the retaining nut, as shown in FIGURE 3, such as by peening the edge of housing 13 against the opposite side of Belleville washer 29 that is in contact with the bushing.

What is claimed as new is:

1. A ball joint bearing with an adjustable preload, said bearing comprising: a housing having a circular aperture therein; a member gradually increasing in transverse diameter in directions from each end toward its center and forming surfaces of revolution, said member being positioned within said aperture; a pair of split ring bushings positioned within said aperture and one of said bushings having at least a portion of its inner wall fitting against one side of said member and the other of said bushings fitting against the opposite side of said member for rotatably mounting said member in said aperture, and manually adjustable means including a spring for forcing, with a predetermined magnitude force, said split ring bushings toward each other to preload said member with a predetermined value of preload and for forcing said bushings against the walls defining said aperture for providing a no-slide fit between said bushins and the walls defining said aperture whereby no substantial relative translational motion between said member, said housing, and said pair of split ring bushings is possible.

2. A ball joint bearing which is easily removable from a bearing housing, said bearing comprising: a bearing housing having a cylindrical aperture therein, said cylindrical aperture being defined by a cylindrical wall in said bearing housing, said housing including a circular flange adjacent to said cylindrical wall and orthogonal thereto; a pair of first and second split ring bushings positioned in said aperture, each of said bushings having inner and outer walls and a pair of first and second sides, said outer walls of said bushings being in contact with said cylindrical wall and at least a portion of said first side of said first ring being contiguous with said flange; a spherical member having a portion of its surface positioned between said pair of split ring bushings, said inner walls of said split ring bushings being in register with a portion of said spherical surface of said member for rotatably coupling said spherical member to said housing, a retaining nut adjustably threadably coupled to said housing, and a spring contacting said retaining nut and said second side of said second ring for physically forcing said first side of said second ring toward said first ring to adjustably preload said spherical member and to force said outer wall of said bushings against said cylindrical wall for providing a no slide fit between said cylindrical wall and said bushings whereby the magnitude of the preload can be regulated by adjusting the degree of coupling of said housing and said retaining nut.

3. The combination comprising: a member gradually increasing in transverse diameter in directions from each end toward its center and forming surfaces of revolution, a pair of first and second split ring bushings having a slot therein and positioned contiguous opposite sides of said member, respectively, said inner walls of said split ring bushings being arcuate in shape to register with portions of the surfaces of revolution of said member; preloading means for compressing said split ring bushings toward each other to preload said bushings, said preloading means including a spring element in contact with said first split ring bushing for forcing said first split ring bushing toward said second split ring bushing and including apparatus for holding said second split ring bushing stationary.

4. A ball joint bearing which is easily removable from a bearing housing without damaging the bearing, said ball joint bearing comprising: a bearing housing having a circular aperture therein and defined by a circular wall in said bearing housing; a pair of bearing rings having inner and outer walls, said bearing rings being positioned in said aperture and with said outer walls of said rings contacting said circular wall; a spherical bearing member positioned within said pair of bearing rings, the surface of said spherical member contacting said inner walls of said rings; preloading means including a spring, said preloading means contacting one of said bearing rings for adjustably forcing the inner walls of said bearing rings against the surface of said spherical bearing members.

5. A ball joint bearing whose preload can be selectively adjusted and which can be easily inserted and removed without special tools from a bearing housing, said ball joint bearing comprising: a bearing housing having a circular aperture therein defined by a circular wall in said bearing housing having a first predetermined radius; a pair of split rings having inner and outer walls and being positioned in said aperture, each of said split rings having a slot therein; a spherical bearing member positioned between said pair of split rings and contacting the inner walls of said rings; preloading means including a spring and a retaining nut, said preloading means contacting one of said split rings for compressing said rings toward each other to adjustably force said inner walls of said split rings against said spherical bearing member and said outer walls of said split rings against said circular wall.

6. The combination defined in claim 5 wherein the inner walls of said split rings having a spherical shape to embrace said spherical bearing member.

7. The combination defined in claim 5 wherein each of said split rings is compressible to butt the ends of each ring against each other resulting in each ring having a second predetermined radius which is less than the first predetermined radius of said aperture.

References Cited in the file of this patent
UNITED STATES PATENTS

| | | |
|---|---|---|
| 1,499,298 | Eller | June 24, 1924 |
| 1,639,692 | Gauthier | Aug. 23, 1927 |
| 2,906,568 | Gray | Sept. 29, 1959 |

FOREIGN PATENTS

| | | |
|---|---|---|
| 654,498 | Germany | Dec. 20, 1937 |
| 1,014,441 | Germany | Aug. 22, 1957 |